Feb. 23, 1965 H. RIEDEL 3,170,983
TWO-OBSERVER MICROSCOPE EQUIPMENT PARTICULARLY WITH CENTRAL
PENTAGONAL PRISM FOR VIEWING SURGICAL OPERATIONS
Filed Nov. 27, 1962
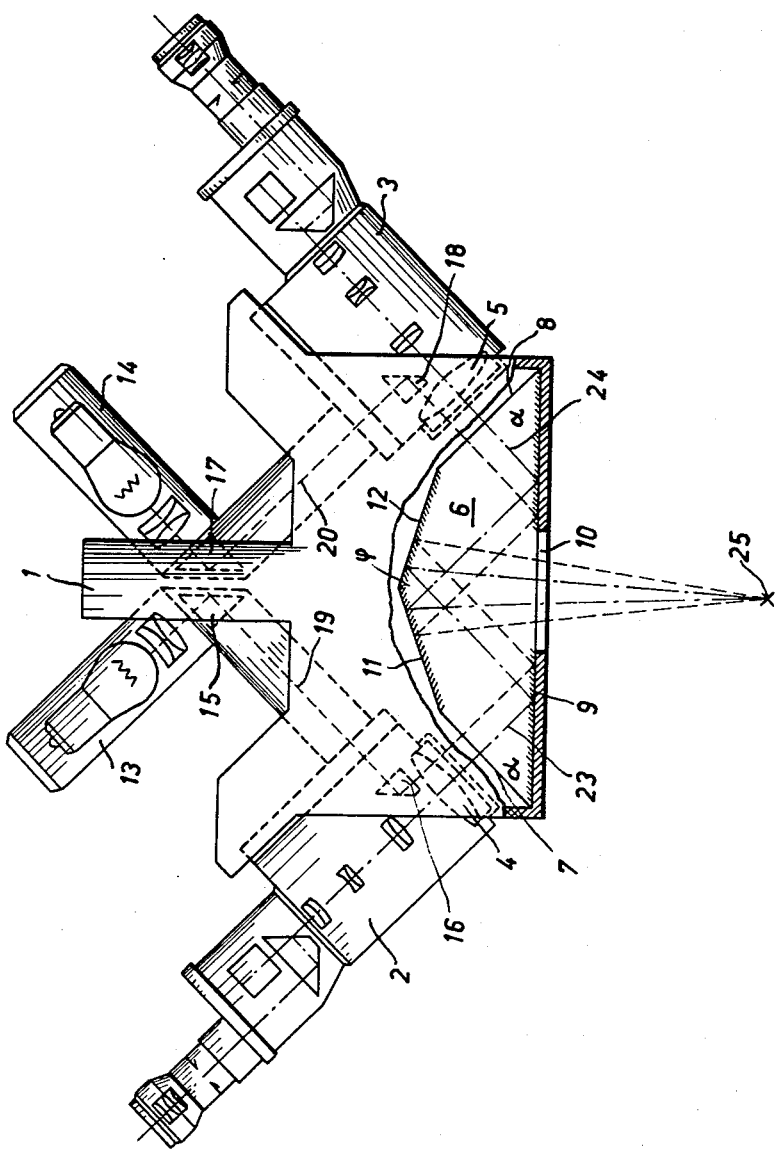

United States Patent Office 3,170,983
Patented Feb. 23, 1965

1

3,170,983
TWO-OBSERVER MICROSCOPE EQUIPMENT PARTICULARLY WITH CENTRAL PENTAGONAL PRISM FOR VIEWING SURGICAL OPERATIONS
Helmut Riedel, Oberkochen, Wurttemberg, Germany, assignor to Carl Zeiss-Stiftung doing business as Carl Zeiss, Heidenheim (Brenz), Wurttemberg, Germany, a German corporation
Filed Nov. 27, 1962, Ser. No. 240,773
Claims priority, application Germany, Dec. 5, 1961, Z 7,571
1 Claim. (Cl. 88—39)

The present invention concerns a microscopic equipment for two observers particularly for the purposes of surgical operations which allow both the operating surgeon and his assistant to do his work in the surgical field with the visual aid of a microscope. The said equipment according to the present invention is characterized in that there is provided a pentagonal prism serving to bring together the illuminating and the observation rays under a very acute angle and arranged between the objective tubes which are inclined at preferably 90° towards each other. The special shape and dimensioning of the said prism enables the observation ray paths of the two constituent microscopes to be united in the object plane at an angle so acute that it is possible to operate even in narrow cavities of the body such as for instance in the inner ear.

The size of the angle between the two observation ray bundles of both the microscopes results from the distance between the centres of the two bundles at the locus of the last reflection. The minimum distance between the centres of the two bundles is determined by the diameter of the said bundles and limits the minimum angle possible between the two observation ray bundles. The said extreme case can, however, be made use of, only when the ray-combining prism according to the invention is constructed in such a way that the illuminating ray bundles are reflected into the object plane on the outside of the observation ray bundles and not between them.

The pentagonal prism according to the invention lying between the objectives has base angles of approximately 45° while the apical angle is greater than 90° but smaller than 180°. With the said design it is attained that the two ray paths entering into the prism from its two sides cross over within the prism so that in the complex ray bundle emerging from the central area of the base face of the prism the observation rays are inside while the illuminating rays pass outside them. Since with the angles of incidence of the rays occurring in the said design total reflection does not generally occur the roof surfaces of the prism as well as its base face are mirror-coated with the exception of the central area in the said base face which serves for the emergence of the rays.

One embodiment of a two-observer microscopic equipment according to the invention is in the following more particularly explained with the help of the drawing, in which the single figure illustrates a front view of the microscope equipment partially broken away to show the pentagonal prism.

The constituent microscopes 2 and 3 attached to a common stand of which the supporting part 1 only is represented are inclined towards each other in such a way that their optical axes include an angle of 90°. The two microscopes are with advantage designed as stereo-microscopes the objectives of which have a common front lens 4 and 5 respectively. Symmetrically located between the said front lenses is the pentagonal prism 6 the base angles α of which are equal to 45° so that the surfaces 7 and 8 of incidence of the rays are passed perpendicularly by both the observation and the illuminaitng rays. The base face 9 of the prism is mirror coated with the exception of a central portion 10. The roof surfaces 11 and 12 are similarly mirror-coated. Between the two microscopes there are located the correlated illuminating devices 13 and 14 from which issue the illuminating ray bundles 19 and 20 which are reflected into the ray paths of the microscopes via the right-angled prisms 15 to 18. As the illuminating ray bundles 19 and 20 pass through the surfaces 7 and 8 of incidence of the prism the said bundles lie on the inside while the observation ray bundles 23 and 24 lie on the outside. After reflection in the mirror-coated surfaces of the prism a complex ray bundle emerges from the base face through the central aperture wherein now the illuminating ray bundles lie on the outside as can be seen in the illustration. According to the choice of the apical angle φ the angle included between the ray bundles united at the point 25 of the surgical field can be made greater or smaller. In order to allow the work to be carried out with bundles of different convergence in different cases it is merely necessary to exchange e.g. a prism with a very obtuse apical angle for another similar prism with a less obtuse apical angle.

I claim:
A two-observer microscope equipment comprising two separate equal microscopes for observation with incident light, said microscopes being united by a common supporting member and arranged symmetrically to a common vertical plane and being combined with two distinct light sources and reflecting means for directing the illuminating rays into the observation ray paths, the objectives together with the oculars as well as said light sources together with the reflecting means being arranged in separate tubes arranged parallel to another and at angles of about 45° to said common vertical plane, a pentagonal prism being arranged symmetrically between said objectives of the two microscopes as to be adapted to combine the observation- and illumination-rays, traversing the two separate microscopes, at an acute angle, said prism having base angles (α) of approximately 45° and an apical angle of 90°<φ<180°, roof surfaces forming said apical angle, and a base surface, all said surfaces being mirror-coated with the exception of a central area in the base surface serving for the penetrating of said combined illumination- and observation-rays.

References Cited by the Examiner
UNITED STATES PATENTS 2,660,922  12/53  Philpot _____ 88—39
2,830,494  4/58   Bouwers et al. _____ 88—39 X
2,967,458  1/61   Stone _____ 88—39 X

FOREIGN PATENTS 92,169   4/23  Austria.
198,738  5/08  Germany.

DAVID H. RUBIN, Primary Examiner.